C. S. ANDERSON.
ANTIFRICTION BEARING.
APPLICATION FILED NOV. 10, 1917.
1,280,621.
Patented Oct. 8, 1918.
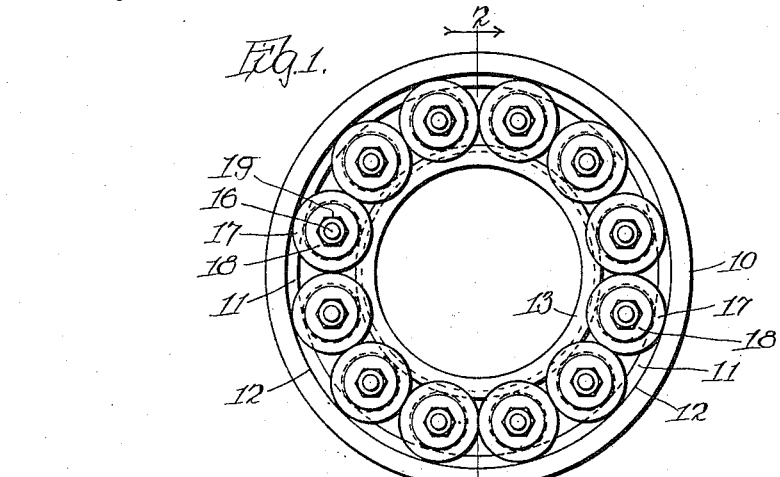
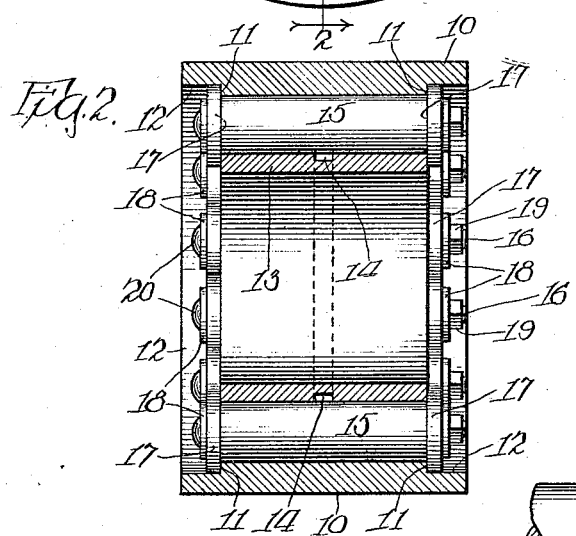
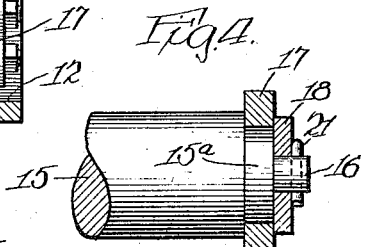
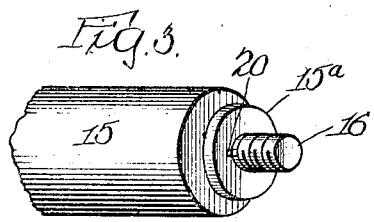
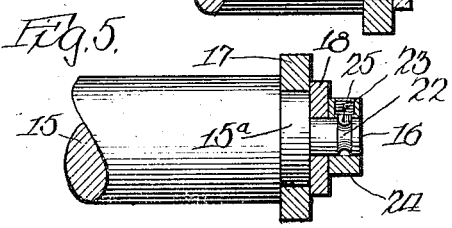
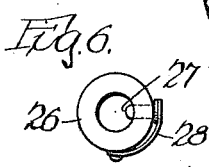
Witness:
Leo J. Dumais.
Inventor.
Carl S. Anderson.
By Chas. C. Tillman
Atty.

UNITED STATES PATENT OFFICE.

CARL S. ANDERSON, OF CHICAGO, ILLINOIS.

ANTIFRICTION-BEARING.

1,280,621.      Specification of Letters Patent.      Patented Oct. 8, 1918.

Application filed November 10, 1917. Serial No. 201,192.

*To all whom it may concern:*

Be it known that I, CARL S. ANDERSON, a subject of the King of Sweden, residing at Chicago, in the county of Cook and State of Illinois, have invented certain new and useful Improvements in Antifriction-Bearings, of which the following is a specification.

This invention relates to improvements in antifriction-bearings of the roller type, and it consists in certain peculiarities of the construction, novel arrangement and operation of the various parts thereof as will be hereinafter more fully set forth and specifically claimed.

The principal object of the invention is, to provide an anti-friction bearing of the roller type, which shall be extremely simple and inexpensive in construction, strong and durable, and so made that the parts thereof can be readily assembled for use, or disassembled for repairs or the replacement of parts should they become defective or impaired. Another object of the invention is to so construct, combine and arrange the various parts of the bearing as to reduce to a minimum the friction incident to the operation of the parts, to the end, that great ease of operation, as well as, high rotary speed will be afforded to the part or parts of the machine or machinery for which the bearing is used.

Other objects and advantages of the invention will be disclosed in the subjoined description and explanation.

In the accompanying drawing which serves to illustrate the invention,

Figure 1 is a face view of an anti-friction bearing device embodying the invention showing the parts thereof in position ready for use.

Fig. 2 is a sectional view taken on line 2—2 of Fig. 1 looking in the direction indicated by the arrows.

Fig. 3 is a perspective view of a portion of one of the rollers of the construction shown in Figs. 1 and 2, but with the bearing-annulus or bushing for said end and the means for holding said annulus in position omitted.

Figs. 4 and 5 are fragmental views of one of the rollers showing modified means for holding the bearing-annulus or bushing in position on the reduced portion of the roller and illustrating said annulus and securing means therefor in section, and Fig. 6 is a detached face view of another modification in the means for holding an annulus and a washer in position on one of the rollers.

Like numerals of reference refer to corresponding parts throughout the different views of the drawing.

Referring now to Figs. 1 to 3 inclusive of the drawing, the reference numeral 10 designates the outer retaining ring or member of the bearing, which may be made of any suitable size and material. As shown, this member is preferably made in the form of a ring, but if desired, may have its outer portion of other shape than circular. Near each of its ends the retaining member 10 has on its inner surface an annular shoulder 11 formed by enlarging the opening in said member outwardly from said shoulders, thus producing an annular track or race 12 at each end of said member for the purpose to be presently explained. The inner retaining member or ring designated by the reference numeral 13 is by preference provided about mid-way between its ends on its outer surface with a circumferentially extended groove or channel 14 for the circulation or distribution of a suitable lubricant. The inner member or ring 13 which may be placed on a shaft or other part to which the bearing is applied is of sufficient length to extend from one of the shoulders 11 to the other shoulder 11 on the inner surface of the outer member when said inner member is located within the outer member, in other words, the length of the inner member is equal to the distance from one of the shoulders 11 to the other shoulder so that the ends of the inner member when the same is in operative position will be flush with said shoulders. Located between the members 10 and 13 are a series of rollers 15 each of which has each of its ends reduced in steps to provide at each end thereof, a bearing portion 15$^a$ and a stub shaft 16, the former being for the reception and operation of a bearing-annulus 17 or bushing, and the latter for the reception of means for holding said annulus or bushing in position on the part 15$^a$ therefor. In the construction shown in Figs. 1 to 3 inclusive of the drawing, the means for holding the annulus or bushing on one end of each of the rollers consists of a washer 18 adapted to rest against the face of the portion 15 at said end of the roller and a nut 19 which is screwed on to the threaded stub shaft 16 as will be clearly understood by reference to Figs. 2 and 3 of the drawing. In order to prevent the washer turning on the shaft 16, said shaft may be provided at its inner end with a key 20 to fit in a suitable opening in the washer which is placed on said shaft. The means for holding the annulus or bushing on the other end of each of the rollers consists in employing a washer 18 which is fastened to the face of the annulus 17 by a spot weld 20ᵃ or otherwise.

By this arrangement it is evident that the nuts 19, washer 18 and annuli on one of the ends of the rollers 15 may be readily detachably fixed to said rollers while the annuli 17 and washers 18 on the other end of said rollers will be permanently fixed thereto or carried thereby. By this arrangement it is obvious that by placing the inner retaining member 13 concentrically within the outer retaining member 10, the rollers 15 can be inserted between said members so that the fixed bearing bushings or annuli 17 thereon will rest against one end of the inner member 13 and one of the shoulders 11 of the outer retaining member. When thus positioned, it is apparent that other bearing bushings 18 may be placed on the opposite ends of the rollers 15 around the parts 15ᵃ thereof and can be held in such position by means of the washers 18 and nuts 19 mounted around and engaging the stub shafts 16 as above explained.

When thus assembled, it is manifest that the bearing bushings or annuli 18 will track on the races or portions 12 of the outer retaining member and will contact with one another while the rollers will have their main portions or bodies located between the outer and inner retaining members.

In Fig. 4 of the drawing, I have shown a slight modification in the construction of the rollers and in the means for securing the bearing bushings 17 thereon which consists in constructing each of the rollers as shown in Fig. 3 and above described, except, that the stub shafts of each roller is without screw-threads and without the key 20, but each of said stub shafts has a transverse opening through which is inserted a pin 21 used for holding the washers in position against the bearing bushings or annuli.

In Fig. 5 is shown still another modification, in which the stub shafts of each roller is provided with a circumferential groove 22 to receive a spring actuated pin 23 radially located in a collar 24 which collar surrounds the shaft 16 so that the pin 23 will engage the groove 22 and thus hold said collar in said position on the stub shaft. The spring which actuates the pin 23 is held in place by screw plug 25 located in an opening in the collar 24, which plug may be removed or turned in the proper direction so that the pin 23 may be disengaged from the groove 22 to permit the removal of said collar.

In Fig. 6 is shown a detached face view of another modification in the means of fastening the bearing bushings and washers on the shafts of the rollers, which consists of a collar 26 having a radial opening in which is located a pin 27, the outer end of which rests against one end of a spring 28 which is secured at its other end to said collar. It is apparent that this collar can be used on stub shafts constructed as shown in Fig. 5 and above described, and its operation is manifest. It will be understood that when the modified forms shown in Figs. 5 and 6 of the drawing are employed, the rollers 15 will be of the same construction as those shown in Figs. 2 and 3 and above described, except, that the stub shafts of each roller is without screw-threads and each has an annular groove to receive the spring pressed retaining springs in the collars.

Having thus fully described my invention, what I claim as new and desire to secure by Letters Patent is—

In an anti-friction bearing device, the combination with an inner and an outer retaining member, said outer member having near each of its ends an inwardly extended shoulder providing raceways between said shoulders and the ends of said member, the inner retaining member being of a length equal to the distance between said shoulders, of a plurality of rollers movably interposed between said members, a bearing bushing of greater diameter than the roller fixed on one end of each of the rollers, and a bearing bushing of the same diameter detachably located on the other end of each of said rollers.

CARL S. ANDERSON.

Witnesses:
Chas. C. Tillman,
Lillie C. Berg.

Copies of this patent may be obtained for five cents each, by addressing the "Commissioner of Patents, Washington, D. C."